United States Patent [19]

Morita

[11] Patent Number: 5,090,890

[45] Date of Patent: Feb. 25, 1992

[54] INJECTION MOLD HAVING A VALVE GATE SYSTEM

[75] Inventor: Kiyoo Morita, Kanagawa, Japan

[73] Assignee: Fuji Photo Film Co., Ltd., Kanagawa, Japan

[21] Appl. No.: 598,522

[22] Filed: Oct. 16, 1990

[30] Foreign Application Priority Data

Oct. 18, 1989 [JP] Japan ............................. 1-121804[U]

[51] Int. Cl.$^5$ ............................................. B29C 45/23
[52] U.S. Cl. ................................... 425/564; 249/103; 425/566
[58] Field of Search ................ 249/103; 425/562, 563, 425/564, 565, 566

[56] References Cited

U.S. PATENT DOCUMENTS 4,781,572 11/1988 Boring .................................. 425/564

Primary Examiner—Timothy Heitbrink
Attorney, Agent, or Firm—Sughrue, Mion, Zinn, Macpeak & Seas

[57] ABSTRACT

An injection mold has a valve gate system in which a valve pin is moved through a runner into and away from a gate to open and close the gate. The valve pin is inserted into the gate to close it after each injection stroke and the end face of the valve pin defines a part of the surface of an injection-molded article when the valve pin is in the gate. The end face of the valve pin is provided with a designed irregularity.

3 Claims, 2 Drawing Sheets

INJECTION MOLD HAVING A VALVE GATE SYSTEM

BACKGROUND OF THE INVENTION

1. Field of the Invention

This invention relates to an injection mold, and more particularly to an injection mold having a valve gate system.

2. Description of the Prior Art

There has been known a hot-runner injection mold having a valve gate system in which a valve pin is moved through a runner into and away from a gate to open and close the gate. The valve pin is inserted into the gate to close it after each injection stroke and the end face of the valve pin defines a part of the surface of an injection-molded article when the valve pin is in the gate.

The hot-runner injection mold having the valve gate system is advantageous over other hot-runner injection molds in that the opening area of the gate during the injection stroke can be large, and accordingly, flowability of resin is better, cycle time can be shortened and a thin article can be molded. Further since the gate is closed after the injection stroke, degating during mold opening stroke is facilitated.

However, since the valve pin is in the runner and is surrounded by hot resin, the gate part of the article opposed to the end face of the valve pin is less apt to cool and accordingly sinkmark is produced in the gate part, which deteriorates the appearance of the molded article.

SUMMARY OF THE INVENTION

In view of the foregoing observations and description, the primary object of the present invention is to provide an injection mold having a valve gate system in which the appearance of the molded article can be improved.

In accordance with the present invention, the end face of the valve pin is provided with a designed irregularity.

The designed irregularity on the end face of the valve pin is transferred to the gate part of the molded article and conceals the sinkmark produced in the gate part.

DESCRIPTION OF THE PREFERRED EMBODIMENTS

Figure 1:
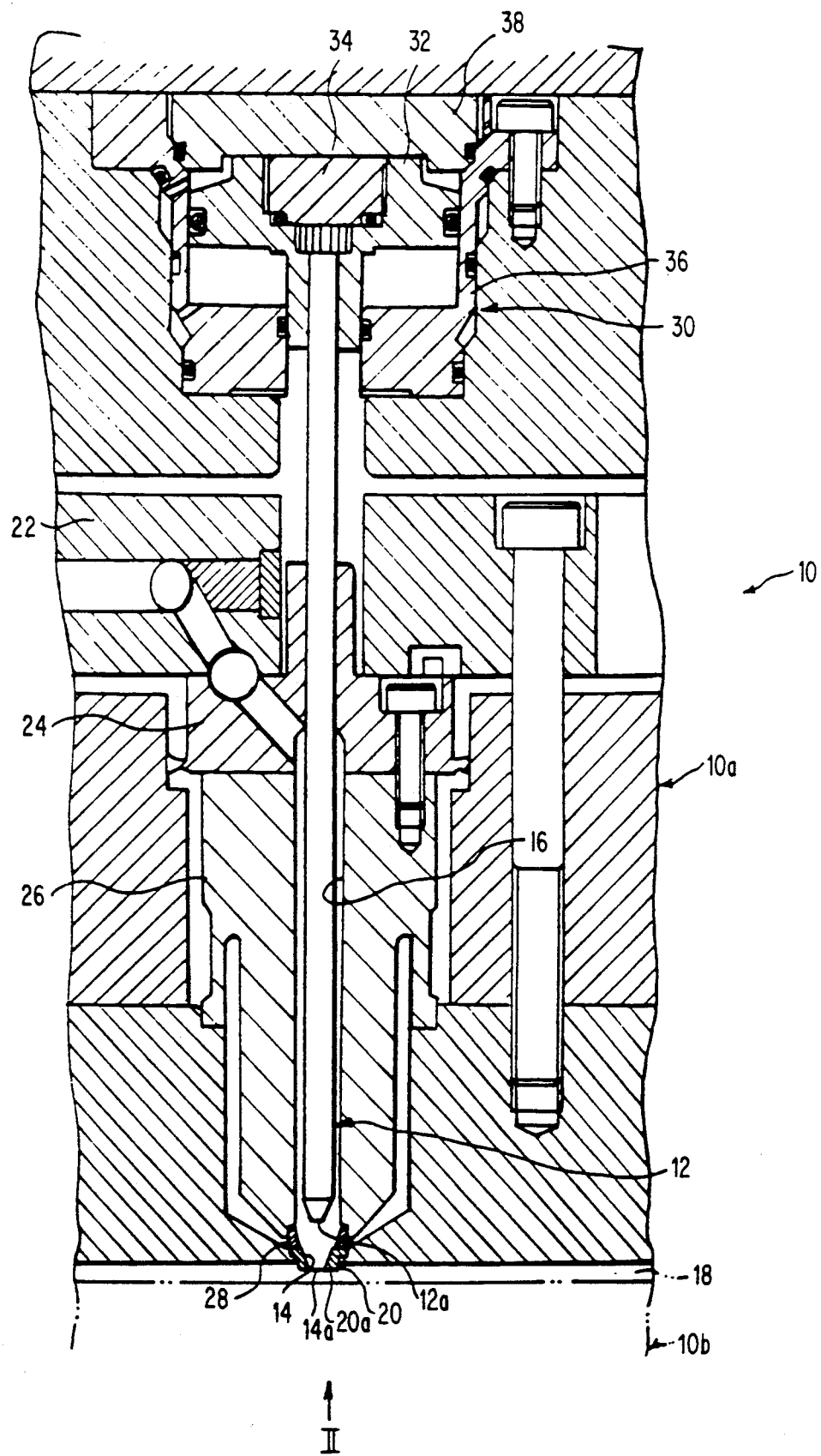
FIG. 1 is a cross-sectional view of an injection mold in accordance with an embodiment of the present invention.

In FIG. 1, an injection mold 10 in accordance with an embodiment of the present invention comprises a fixed half 10a and a movable half 10b (shown by chained line). When the injection mold 10 is closed a cavity 18 is formed between the fixed half 10a and a movable half 10b. A runner 16 is formed in the fixed half 10a and communicates with the cavity 18 through a gate 14. Molten resin is injected into the cavity 18 from an injection nozzle (not shown) through the runner 16 and the gate 14. The injection mold 10 is provided with a valve gate system having a valve pin 12. The valve pin 12 is supported in the fixed half 10a and is movable back and forth in the runner 16. During each injection stroke, the valve pin 12 is in an upper position away from the gate 14 and when the injection stroke is completed, the valve pin 12 is moved downward into the gate 14 and closed the gate 14. When the valve pin 12 closes the gate 14, the end face 12a of the valve pin 12 is flush with an open end 14a of the gate 14.

The gate 14 is formed in a gate block 20 and is tapered toward the cavity 18. The runner 16 extends through a manifold 22, a valve bushing 24, a cast heater 26 and a titanium seal 28. The cast heater 26 keeps the resin in the runner 16 in molten state. A predetermined clearance is provided between the lower surface of the titanium seal 28 and the upper surface of the gate block 20 so that they are brought into close contact with each other when heated by the cast heater 24.

The valve pin 12 extends through the valve bushing 24 into the runner 16 and is connected to a piston 32 of an air cylinder mechanism 30. The air cylinder mechanism 30 comprises a cylinder 36 in which the piston 32 is slidably received. The cylinder 36 is fixed to the fixed half 10a and the top of the cylinder 36 is closed by a plug 38. The upper end portion of the valve pin 12 is fixed to the piston 32 by a retainer plug 34. The valve pin 32 is moved up and down under the air pressure in the cylinder 36.

The lower end portion of the valve pin 12 is tapered so that the outer surface of the lower end portion is brought into close contact with the inner surface of the gate 14 and closes the gate 14 when the valve pin 12 is inserted into the gate 14. When the valve pin 12 is in the gate 14 and closes the gate 14, the end face 12a of the valve pin 12 is substantially flush with the open end 14a of the gate 14, i.e., the lower surface 20a of the gate block 20.

Figure 2:
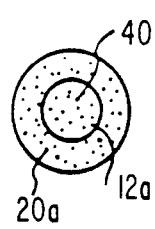
FIG. 2 is a fragmentary view as viewed in the direction of arrow II in FIG. 1, and FIGS. 3 and 4 are views similar to FIG. 2 but for illustrating other embodiments of the present invention.

The end face 12a of the valve pin 12 and the lower surface 20a of the gate block 20 are provided with embossed portion 40 as shown in FIG. 2.

Accordingly, even if sinkmark is produced in the gate part of the molded article, the emboss 40 on the end face 20a of the valve pin 20 is transferred to the gate part of the molded article and conceals the sinkmark.

In this embodiment, not only the part of the molded article opposed to the valve pin 12 but also the mount surrounding the gate part is recessed. Accordingly, both the end face 12a of the valve pin 12 and the lower surface 20a of the gate block 20 are provided with the emboss 40. However, the lower surface 20a of the gate block 20 need not be provided with the emboss 40.

Figure 3:
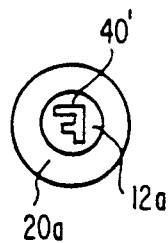
Figure 4:
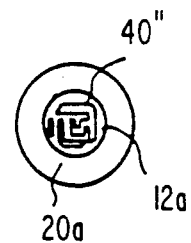

The designed irregularity may be a negative character 40' or a negative logotype 40" as shown in FIGS. 3 and 4. When the end face 12a of the valve pin 12 is provided with the negative character 40', character "F" is transferred to the gate part of the molded article. When the end face 12a of the valve pin 12 is provided with the negative character 40", logotype "Fuji" is transferred to the gate part of the molded article. By providing a meaning character, number or the like on the end surface 12a of the valve pin 12, the sinkmark in the gate part of the molded article is concealed and at the same time, the molded article can be provided with necessary information.

I claim:

1. An injection mold having a valve gate system including a runner and a valve pin slidably disposed in said runner so as to be movable into and away from a gate to open and close the gate, the valve pin being inserted into the gate to close said gate after each injection stroke and an end face of the valve pin defining a part of the surface of an injection-molded article when the vale pin is in the gate, said end face comprising means for concealing a sinkmark produced on a surface of said molded article opposite said valve pin, said concealing means including a predetermined design irregularity provided on said end face of the valve pin.

2. An injection mold as defined in claim 1 in which said design irregularity is embossed on said end face of the valve pin.

3. An injection mold as defined in claim 1 in which said designed irregularity provides information on the surface of the molded article when said designed irregularity is transferred to the surface of the molded article.

* * * * *